US012571939B2

(12) United States Patent
Argan et al.

(10) Patent No.: US 12,571,939 B2
(45) Date of Patent: Mar. 10, 2026

(54) METHOD AND SYSTEM FOR MONITORING THE PRECIPITATION OF PARTICLES IN THE MAGNETOSPHERE

(71) Applicants: ISTITUTO NAZIONALE DI ASTROFISICA—INAF, Rome (IT); AGENZIA SPAZIALE ITALIANA, Rome (IT)

(72) Inventors: Andrea Argan, Rome (IT); Marco Tavani, Rome (IT); Alessio Trois, Rome (IT)

(73) Assignees: ISTITUTO NAZIONALE DI ASTROFISICA—INAF, Rome (IT); AGENZIA SPAZIALE ITALIANA, Rome (IT)

( * ) Notice: Subject to any disclaimer, the term of this patent is extended or adjusted under 35 U.S.C. 154(b) by 745 days.

(21) Appl. No.: 17/802,765

(22) PCT Filed: Feb. 17, 2021

(86) PCT No.: PCT/IB2021/051335
§ 371 (c)(1),
(2) Date: Aug. 26, 2022

(87) PCT Pub. No.: WO2021/176289
PCT Pub. Date: Sep. 10, 2021

(65) Prior Publication Data
US 2023/0142341 A1     May 11, 2023

(30) Foreign Application Priority Data
Mar. 2, 2020     (IT) ........................ 102020000004339

(51) Int. Cl.
G01W 1/14          (2006.01)
B64G 1/10          (2006.01)
(Continued)

(52) U.S. Cl.
CPC ............. G01W 1/14 (2013.01); B64G 1/1007 (2013.01); G01T 1/12 (2013.01); G01T 1/178 (2013.01); G01V 1/288 (2013.01)

(58) Field of Classification Search
CPC ......... G01W 1/14; B64G 1/1007; G01T 1/12; G01T 1/178; G01T 1/006; G01T 5/00; G01V 1/288; G01V 1/01; G01V 3/082
See application file for complete search history.

(56) References Cited

U.S. PATENT DOCUMENTS

| | | | | |
|---|---|---|---|---|
| 9,245,726 | B1 * | 1/2016 | Herrero | ................... H01J 49/22 |
| 2011/0102961 | A1 * | 5/2011 | Lane | ......................... H05F 7/00 |
| | | | | 361/212 |
| 2019/0068044 | A1 * | 2/2019 | Petrovich | ............... G21C 15/00 |

OTHER PUBLICATIONS

Zuccon et al. "Atmospheric production of energetic protons, electrons and positrons observed in near Earth orbit", 2003 (Year: 2003).*

(Continued)

*Primary Examiner* — Eyob Hagos
(74) *Attorney, Agent, or Firm* — ArentFox Schiff LLP; Michael Fainberg

(57)          ABSTRACT

A method for monitoring precipitation of magnetospheric particles includes detecting charged magnetospheric particles by a particles detector, processing the detection data to associate a respective estimate or measurement of kinetic energy with the detected magnetospheric particles, obtaining a first count value $N_H$ associated with a relatively higher estimate or measurement of kinetic energy, obtaining a second count value $N_L$ associated with a relatively lower estimate or measurement of kinetic energy, detecting a relative variation of the second count value $N_L$ with respect to the first count value $N_H$, determining that an impulsive event of precipitation of charged magnetospheric particles (MPP event) in the magnetosphere occurred, assigning to the
(Continued)

MPP event geomagnetic longitude and time, defining one or more groups of MPP events occurred in a time range at a same geomagnetic longitude, and identifying a group of MPP events indicative of an activity of terrestrial origin.

16 Claims, 5 Drawing Sheets

(51) Int. Cl.
| | |
|---|---|
| *G01T 1/12* | (2006.01) |
| *G01T 1/178* | (2006.01) |
| *G01T 5/00* | (2006.01) |
| *G01V 1/28* | (2006.01) |

(56) References Cited

OTHER PUBLICATIONS

Chilingarian et al. "Particle bursts from thunderclouds: Natural particle accelerators above our heads" 2011 (Year: 2011).*

International Search Report, issued in PCT/IB2021/051335, mailed May 21, 2021, Rijswijk, NL.

Sgrigna V. et al., Correlations between earthquakes and anomalous particle bursts from SAMPEX/PET satellite observations, Journal of Atmospheric and Solar-Terrestrial Physics, Oct. 1, 2005, pp. 1448-1462, vol. 67, No. 15, Pergamon, Amsterdam, NL.

Xiangxiang Yan et al., Multiparameter seismo-ionospheric anomaly observation before the 2008 Wenchuan, China, Mw7.9 earthquake, Journal of Applied Remote Sensing, Jul. 19, 2013, p. 73532, vol. 7, No. 1, Society of Photo-Optical Instrumentation Engineers, US.

Chilingarian A. et al., Correlated measurements of secondary cosmic ray fluxes by the Aragats Space-Environmental Center monitors, Nuclear Instruments & Methods in Physics Research, Section A, May 11, 2005, pp. 483-496, vol. 543, No. 2-3, Elsevier BV, NL.

Aleksandrin S. Yu et al., High-energy charged particle bursts in the near-Earth space as earthquake precursors, Annales Geophysicae, Feb. 28, 2003, pp. 597-602, vol. 21, Issue 2, European Geosciences Union, Copernicus Publications, DE.

Galper A. M. et al., Relationship between fluxes of high-energy charged particles in the radiation belt with the earth's seismicity, Cosmic Research, Sep. 1989, pp. 789-792, vol. 27.

Hayakawa M. et al., On the possible influence of seismic activity on the propagation of magnetospheric whistlers at low latitudes, Physics of the Earth and Planetary Interiors, Apr. 1993, pp. 97-108, vol. 77, Issues 1-2, Elsevier.

Hayakawa M. et al., The ultra-low-frequency magnetic disturbances associated with earthquakes, Earthquake Science, Dec. 10, 2011, pp. 523-534, vol. 24, Issue 6, Springer Nature.

Ohta K. et al., The ULF/ELF electromagnetic radiation before the Mar. 11, 2011 Japanese earthquake, Radio Science, first published Sep. 30, 2013, pp. 589-596, vol. 48, Issue 5, American Geophysical Union, US.

Currie J. L. & Waters J. L., On the use of geomagnetic indices and ULF waves for earthquake precursor signatures, Journal of Geophysical Research: Space Physics, first published Jan. 17, 2014, pp. 992-1003, vol. 119, Issue 2, American Geophysical Union, US.

Park S. A. et al., Electromagnetic precursors to earthquakes in the ULF band: A review of observations and mechanisms, Reviews of Geophysics, first published May 1993, pp. 117-132, vol. 31, Issue 2, American Geophysical Union, US.

Hayakawa M., Earthquake Prediction with Radio Techniques, first published Jul. 3, 2015, John Wiley & Sons, Singapore Pte. Ltd.

Sergey Pulinets, Kirill Boyarchuk, Ionospheric Precursors of Earthquakes, Jan. 2004, Springer.

Onishi T. et al., The DEMETER mission, recent investigations on ionospheric effects associated with man-made activities and seismic phenomena, Comptes Rendus Physique, Mar. 2011, pp. 160-170, vol. 12, Issue 2, Elsevier Masson SAS.

Parrot M. et al., Examples of unusual ionospheric observations made by the DEMETER satellite over seismic regions, Physics and Chemistry of the Earth, Parts A/B/C, 2006, pp. 486-495, vol. 31, Issues 4-9, Elsevier.

Tavani M. et al., The AGILE Mission, Astronomy & Astrophysics, published online Jan. 30, 2009, pp. 995-1013, vol. 502, No. 3, EDP Sciences, FR.

Argan A. et al., AGILE as a particle detector: Magnetospheric measurements of 10-100 MeV electrons in L shells less than 1.2, Journal of Geophysical Research: Space Physics, first published Mar. 28, 2016, pp. 3223-3239, vol. 121, Issue 4, American Geophysical Union, US.

* cited by examiner

METHOD AND SYSTEM FOR MONITORING THE PRECIPITATION OF PARTICLES IN THE MAGNETOSPHERE

CROSS-REFERENCE TO RELATED APPLICATIONS

This application is a National Phase Application of PCT International Application No. PCT/IB2021/051335, having an International Filing Date of Feb. 17, 2021 which claims priority to Italian Application No. 102020000004339 filed Mar. 2, 2020, each of which is hereby incorporated by reference in its entirety.

FIELD OF THE INVENTION

The present invention relates to the technical field of satellite systems for monitoring particles in space and, in particular, for acquiring and processing data relating to the activity of particles. Specifically, the invention relates to a method and a system for monitoring the precipitation of particles in the magnetosphere, which may be implemented using a particles detector. Such method and such monitoring system may be used, for example, to identify possible active regions for pre-seismic activity and to provide alerts for latent activity linked to earthquakes. The monitoring system and method may be used to monitor, in general, electromagnetic perturbations of the Earth magnetosphere induced by terrestrial phenomena.

PRIOR ART

Demonstrating, with high and reliable statistical significance, a method for correlating physical signals, detectable by means of the current technology, and earthquakes is a difficult problem to solve. Previous attempts during the last few decades have involved several research groups in many countries affected by strong seismic activity, including groups in Italy, Greece, the USA, Japan and China. The methods used have involved ground measurements and, more recently, measurements with space instruments.

Several cases of anomalous emission of electromagnetic signals with peculiar properties have been reported, temporally and spatially coincident with energetic earthquakes, i.e., earthquakes of a particularly great intensity. Such results, while interesting, are limited to the determination of occasional evidence between earthquakes and ground or space measurements. The causes thereof are many: lack of a systematic study of such effects over a sufficiently long period of time (years), result reproducibility issues, high background noise influencing the measurement processes, weak overall statistical evidence. No correlation attempt obtained so far has been supported by a highly statistically significant post-trial determination of the probability of occurrence of such results.

Studies of possible correlations between peculiar magnetospheric particles events and earthquakes have been carried out since the late 1980s. The first works on this topic are by Galper A. M. et al. (1989) as described, for example, in:

Aleksandrin, S. Yu.; Galper, A. M.; Grishantzeva, L. A.; Koldashov, S. V.; Maslennikov, L. V.; Murashov, A. M.; Picozza, P.; Sgrigna, V.; Voronov, S. A., "High-energy charged particle bursts in the near-Earth space as earthquake precursors", Annales Geophysicae, 21, 597-602 (2003); and Galper, A. M., et al., "Connection of the fluxes of charged particles of high energy in radiation belt with the Earth seismicity", Cosmic Research, 27, 789-792 (1989).

In such studies an attempt was made to develop a method for obtaining a correlation between seismic events and electromagnetic perturbations. The method of Galper et al. is based on:

a magnetosphere and lithosphere coupling model based on the propagation of electromagnetic waves which propagate along the magnetic L-shells (defined as the field lines identified by the distance in units of terrestrial rays at which the magnetic field lines intersect the equatorial plane of the Earth magnetosphere) and on the interaction of these waves with the particles trapped in the L-shell, a phenomenon which leads to the precipitation of particles;

a selection of earthquakes with magnitude (in MMS scale) $M \geq 5$ (which is a rather low value, and which therefore leads to correlations between the precipitation of magnetospheric particles and earthquakes of a low statistical significance);

an identification of the precipitation of particles based on increases or bursts of high-energy particles produced by wave-particle resonance. These precipitations of particles are observed by satellites with appropriate equipment for detecting magnetospheric particles;

a temporal correlation between the precipitation of magnetospheric particles and seismic events based on the time difference between the precipitation of magnetospheric particles and seismic events occurring on the same L-shells within a narrow range.

However, due to the methods chosen and the earthquake population selected (of too low magnitude), the results of the above studies are marginal from a statistical point of view. In recent years, there have been no substantial improvements since these first attempts.

A general description of the above methods is presented, for example, by Pulinets & Boyarchuk in Pulinets, S. & Boyarchuk, K., "Ionospheric Precursors of Earthquakes", Springer (2004). In this publication, the section devoted to the detection of the precipitation of magnetospheric particles is based on the aforementioned articles by Galper et al.

An informed description of electromagnetic waves possibly associated with earthquakes may be found in Hayakawa M., "Earthquake Prediction with Radio Techniques", (Singapore, John Wiley & Sons, 2015). In this publication and in further publications:

Hayakawa, M., Yoshino, T. & Morgounov, V. A., "On the possible influence of seismic activity on the propagation of magnetospheric whistlers at low latitudes", Phys. Earth and Planet. Interiors, 77, 97-108 (1993);

Hayakawa, M., Hobara, Y., Ohta, K., & Hattori, K., "The ultra-low frequency magnetic disturbances associated with earthquakes", Earthquake Sci., 24(6), 523-534 (2011);

Ohta, K., Izutsu, J., Schekotov, A. & Hayakawa, M., "The ULF/ELF electromagnetic radiation before the 11 Mar. 2011 Japanese earthquake", Radio Science, 48, 589-596 (2013); circumstantial evidence is presented regarding the emission of low-frequency electromagnetic waves observed in relation to earthquakes of great magnitude. These ground-based observations focus on the detection of ULF and VLF waves using instruments positioned on the ground, with emissions possibly coincident with powerful earthquakes. See also publications:

Currie, J. L & Waters, J. L., "On the use of geomagnetic indices and ULF waves for earthquakes precursor signatures", J. Geophys. Res. Space Physics, 119, 992-1003 (2014);

Park, S. A., Johnston, M. J. S., Madden, T. R., Morgan, F. D. & Morrison, H. F., "Electromagnetic precursors to earthquakes in the ULF band: a review of observations and mechanisms", Rev. Geophys., 31, 117-132 (1993).

Furthermore, some cases of magnetospheric anomalies regarding the so-called total electron content (TEC) have also been discussed given the proximity in space and time thereof with some earthquakes, for example, in the above publication: Hayakawa, M., Earthquake Prediction with Radio Techniques, (Singapore, John Wiley & Sons).

However, none of the aforementioned studies present a systematic research and no global statistical analysis of the possible correlations between ULF/VLF signals and/or TEC anomalies with earthquakes was discussed, even if it were possible to identify candidates therefrom.

The DEMETER satellite group (operational in the period 2004-2010) has published observations of wave perturbations in the ionosphere in spatial and temporal proximity to earthquakes of great magnitude. See for example publications:

Onishi, T., Parrot, M. & Berthelier, J.-J., "The DEMETER mission, recent investigations on ionospheric effects associated with man-made activities and seismic phenomena", Comptes Rendus Physique, 12, 160-170 (2011); and Parrot, M., Berthelier, J.-J., Lebreton, J.-P., Sauvaud, J.-A., Santolik, O., and Blecki, J., "Examples of unusual ionospheric observations made by the DEMETER satellite over seismic regions", Physics and Chemistry of the Earth, 31, 486-495 (2006).

These observations from space (from a height of about 700 km) show interesting detections of VLF and LF waves. However, a global analysis of DEMETER data in temporal proximity to earthquakes does not support the existence of a correlation with a high statistical significance between these wave emissions and earthquakes.

In practice, so far, no satisfactory demonstration (based on a rigorous and complete statistical analysis) of a systematic correlation between events of magnetospheric particles and earthquakes has been provided. The existence of such a correlation would imply that earthquakes emit electromagnetic and plasma waves capable of propagating along the magnetic field lines and of interacting, by resonance, with electrons and positrons (secondary albedo particles) in the inner Earth magnetosphere. Only circumstantial evidence has been presented in the above literature, and evidence of possible correlations has so far been discussed with completely unsatisfactory statistical analyzes.

One of the main issues of the method of Galper et al. is linked to the use of L-shells to locate the geographic area potentially affected by the seismic event. Conventionally, the area identified by the aforementioned method consists of two "bands", almost horizontal in longitude, which correspond to the points of intersection of the magnetic field lines, corresponding to given L-shells, with the surface of the Earth, one above the magnetic equator and another one below, both extending to the entire circumference of the Earth. This feature produces great uncertainty about the geographical area where the seismic event may occur.

Another major limitation of the method of Galper et al. is the low statistical significance and the great number of false correlations (false positives) induced by the choice of correlating magnetospheric events with earthquakes of a magnitude with relatively low threshold (M=5).

With regard to the magnetospheric anomalies which have been proposed in correlation with earthquakes (such as the phenomena affecting the TEC), this evidence has always been presented as events of a "post-factum" nature without a full discussion of the global context in which such anomalies are normally revealed, without mentioning the missing discussion of "false positive" events. Similar conclusions may be deduced for the results of the DEMETER satellite, which aim at highlighting ionospheric perturbations and/or anomalous electromagnetic signals in the lower magnetosphere.

It is therefore possible to conclude that the current magnetospheric measurements of particle bursts associable with earthquakes through magnetic L-shells, anomalies of the TEC type, and ionospheric perturbations constitute, at best, only circumstantial evidence for a possible correlation with earthquakes. Therefore, investigations based on these assumptions, or on the methods proposed so far, are not based on satisfactory statistical evidence.

SUMMARY OF THE INVENTION

The need is therefore still felt to develop a monitoring method which allows to fully, or at least partially, overcome the drawbacks and limitations of the methods of the prior art described above. It is therefore a general object of the present description to provide a monitoring method which allows to satisfy the aforementioned need.

Such general object is achieved by a monitoring method as described and claimed herein. Preferred and advantageous embodiments of the monitoring method are also described.

The invention will be better understood from the following detailed description of particular embodiments, provided by way of example and consequently not limiting in any manner, with reference to the accompanying drawings which are briefly described in the following paragraphs.

BRIEF DESCRIPTION OF THE DRAWINGS

FIG. 5b shows a timing histogram of historical data relating to seismic events in the same period of time as the diagram of FIG. 5a.

DETAILED DESCRIPTION

Figure 1:
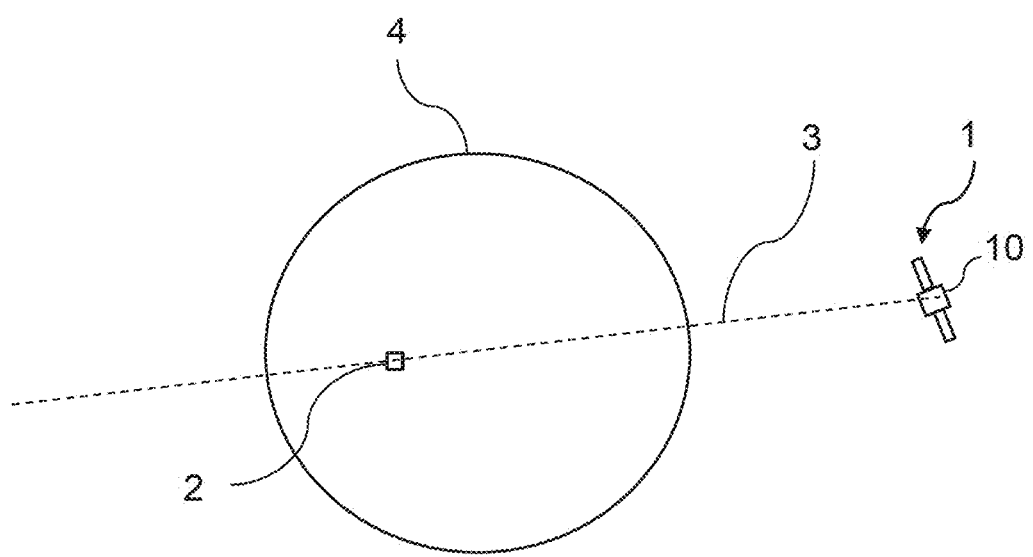
FIG. 1 shows a diagrammatic view of a non-limiting embodiment of an example of a system adapted and configured to implement a method for monitoring the precipitation of particles in the magnetosphere according to the present invention.
Figure 3:
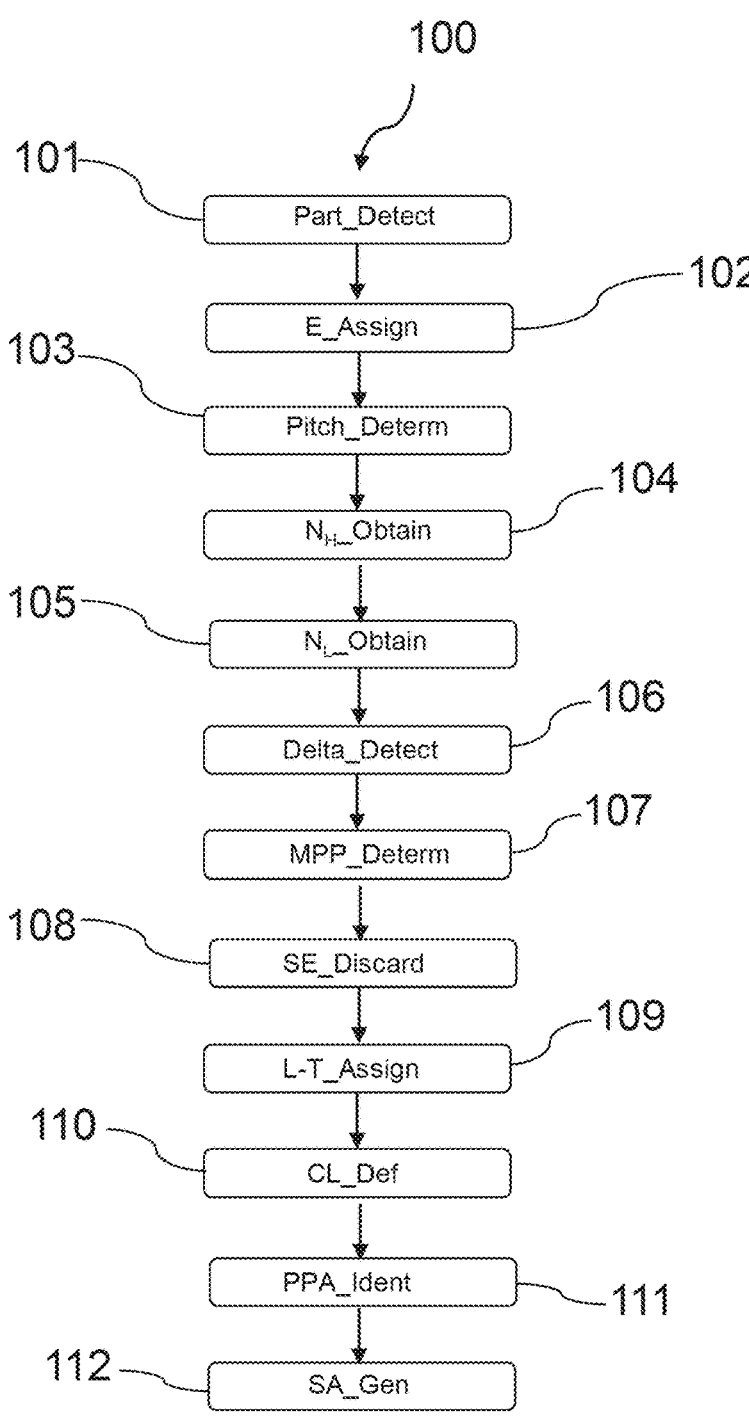
FIG. 3 shows a non-limiting embodiment of a flow chart of the method for monitoring the precipitation of particles in the magnetosphere according to the present invention.

FIG. 1 shows a non-limiting embodiment of a monitoring system 1, 2 adapted and configured to implement a method 100 for monitoring the precipitation of particles in the magnetosphere according to the present invention. FIG. 3 shows a flow chart of a possible exemplary and non-limiting embodiment of the aforementioned monitoring method 100.

With reference to FIG. 1, the monitoring system 1, 2 comprises a space segment comprising at least one satellite vehicle 1, or, more briefly, an artificial satellite 1 or satellite 1, movable on an orbit 3 with respect to planet Earth 4. On board the satellite vehicle 1, at least one particles detector 10 is installed, adapted and configured to detect charged magnetospheric particles, preferably charged particles with kinetic energy lower than 1 GeV.

In accordance with an advantageous embodiment, the aforementioned space segment comprises a plurality of satellite vehicles 1, i.e., a constellation of satellite vehicles 1, on each of which a respective particles detector 10 is installed.

The monitoring system 1, 2 comprises at least one ground segment comprising at least one ground station 2 adapted and configured to operatively connect, directly or indirectly, with the satellite vehicle 1 to receive telemetry data transmitted by the satellite vehicle 1. The ground station 2 comprises, in a manner per se known, satellite data reception apparatuses and one or more processors adapted and configured to process received data to produce processed data. The aforementioned operative connection may be direct or take place by means of other satellite vehicles 1 or, in general, space vehicles or stations. The ground station may comprise several stations, geographically distributed and operatively connected to one another. The monitoring system 1, 2 preferably comprises a display system (not shown in the Figures), such as, for example, at least one display, adapted and configured to display the processed data. The display system is, for example, accommodated in the ground station 2 or in another station or processing center operatively connected to the ground station 2.

In accordance with a particularly advantageous embodiment, the orbit 3 of the satellite vehicle 1 is an equatorial orbit, preferably an equatorial low Earth orbit (LEO). Since the charged particles of interest for the monitoring method 100 according to the present invention are charged particles in resonance with magnetospheric plasma waves (the latter being a physical phenomenon which occurs in an efficient manner only with particles such as electrons and positrons), several advantages may be obtained by choosing equatorial LEO orbits with respect to polar orbits, and in particular:

in an equatorial LEO orbit, the flow of particles in the energy range between 0.01 GeV and 0.10 GeV is dominated by electrons and positrons (which appear to be secondary albedo particles, with respect to primary cosmic rays). The flow thereof is between $10^3$-$10^4$ ($m^2$ s sr GeV)$^{-1}$ at a height of about 500 km;

an equatorial orbit allows to avoid the background due to the high flow of solar particles as well as the background induced by the flow of cosmic protons in the kinetic energy range below 1 GeV;

an equatorial orbit is the best for acquiring signals according to geomagnetic longitude. On the contrary, polar orbits would not be adapted for this purpose since they lead to acquire signals mainly according to L-shells and not longitudes.

In accordance with a particularly preferred but not limiting embodiment, the satellite vehicle 1 is, for example, the satellite called AGILE, described, for example, in the article by Tavani, M. et al., "The AGILE Mission, Astron. & Astrophys.", 502, 995-1013 (2009).

The AGILE satellite is, in fact, in a unique condition to study the phenomenon of the precipitation of particles in the inner magnetosphere since the orbit thereof is not affected by solar storms or by external magnetic perturbations. The AGILE satellite currently orbits the Earth in an equatorial orbit about 500 km high. On the AGILE satellite, a particles detector 10 is installed which, in particular, is an imaging gamma detector (GRID), which, in addition to detecting cosmic gamma rays with an energy of over 20 MeV, is also capable of efficiently detecting charged magnetospheric particles. This is, for example, accurately described in the article by Argan, A., Piano, G., Tavani, M. & Trois, A., "AGILE as a particle detector", Journal Geophys. Res., 121, 3223-3239 (2016). This latter paper, with regard, in particular, to the structure and operation of the particles detector GRID, is herein entirely incorporated as a reference for describing the structure and operation of a non-limiting example of particle detector 10 suitable for being employed in the monitoring method 100 according to the present invention.

In the case of the AGILE satellite, the flow of charged particles in the orbit of about 95 min. is dominated by electrons and positrons with kinetic energies lower than one GeV. The charged particles detection rate by the particles detector GRID (after crossing the anticoincidence system of the aforementioned detector) is relatively low (a few Hz). The orbit 3 of the AGILE satellite is not subject to transient increases in the number of charged particles induced by solar activity or magnetic perturbations which instead strongly affect other satellites on inclined or polar orbits.

In the case of the AGILE satellite, the acceptance of the particles detector GRID for detecting particles is approximately 50 cm$^2$sr, with an instrumental response which depends on the angle of incidence of the particle with respect to the axis of the particles detector GRID; the detection of cosmic gamma photons therefore coexists with an efficient acquisition of data of charged particle events. These latter events trigger the on-board data acquisition system and are transmitted to the ground station 2 with precise data preferably regarding acquisition time, local magnetic field and information on the orbital position.

With reference now to FIG. 3, the monitoring method 100 comprises a step 101 of detecting ("Part Detect") charged magnetospheric particles by the particles detector 10 installed on board the satellite vehicle 1 in orbit, associating the detected charged particles with respective detection data.

As already explained, a possible example of particles detector 10 is the particles detector GRID installed on board the AGILE satellite, and in such case it is a gamma ray imaging detector which is also such as to detect charged magnetospheric particles, for example, charged with kinetic energy below 1 GeV. In alternative embodiments, the particles detector 10 may, for example, be a simpler and less bulky particles detector, for example, configured to detect and track exclusively charged particles.

In accordance with a general embodiment, the particles detector 10 comprises a particles imaging tracker and/or an imaging calorimeter.

In accordance with a particularly advantageous embodiment, the particles detector 10 comprises a multilayer structure 11 or a segmented structure 11, for example, comprising a plurality of solid-state planar sub-detectors and, for example, made of silicon-tungsten, arranged to form a stack of sub-detectors aligned along an axis z. Each of the aforementioned sub-detectors allows, for example, to detect, for each charged particle, the coordinates x, y on an impact plane and preferably a quantity of charge deposited by the charged particle on the sub-detector. The aforementioned multilayer structure therefore allows to trace in 3D the path of the charged particles inside the particles detector 10.

Figure 2:
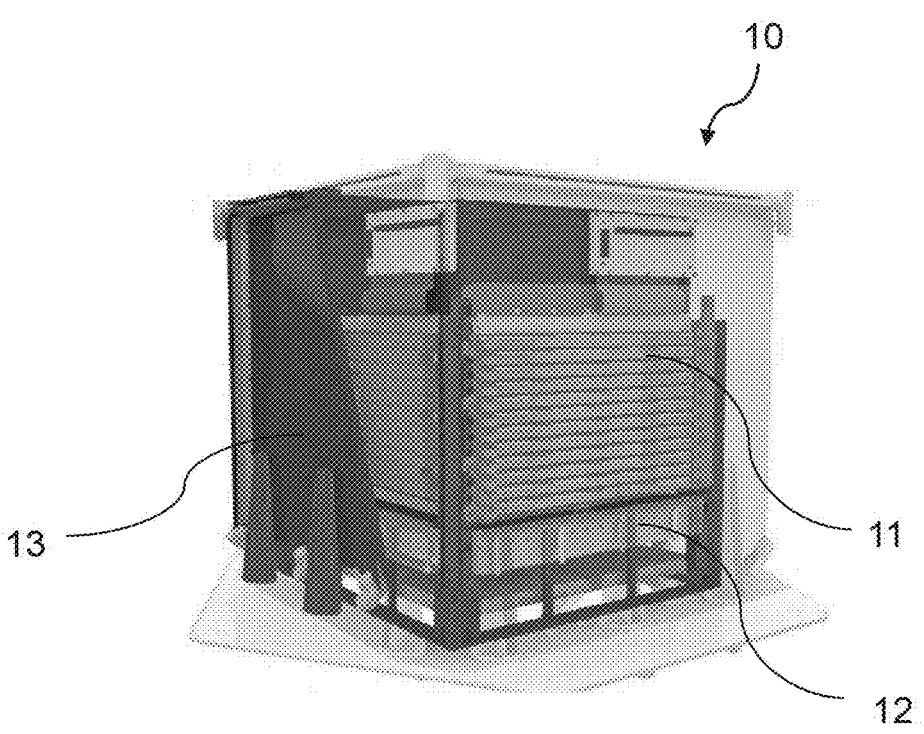
FIG. 2 shows a possible embodiment of a particles detector which may be employed in the system of FIG. 1.

Charged particles with a relatively high amount of kinetic energy may cross the entire multilayer structure 11 and affect all the sub-detectors, also according to the direction, while charged particles with a relatively small amount of kinetic energy may stop after the impact with one or more of the sub-detectors. In the particular example shown in FIG. 2, which corresponds to the particles detector GRID installed on board the AGILE satellite, the particles detector 10 comprises a multilayer structure 11 and preferably also a calorimeter 12, for example in cesium iodide, in which the multilayer structure 11 is above the calorimeter 12. The particles detector 10 may comprise, for example, an antico-incidence screen 13.

For example, the detection data associated with each charged particle in step 101 of the monitoring method 100 include data related to the path, for example in 3D, of the charged particle inside the particles detector 10 and/or the quantity of charge deposited by the particle in the detector 10 and/or the time in which the detection of the charged particle occurred and/or the geomagnetic longitude at which the detection of the particle occurred.

The monitoring method 100 further comprises a step 102 ("E_Assign") of processing the detection data to associate, i.e. assign, the detected magnetospheric particles to a respective estimate or measurement of kinetic energy. Estimate or measurement of kinetic energy means any data of the quantitative type corresponding, or correlated, to the kinetic energy of the charged particle. This estimate or measurement may be obtained according to various methodologies known to the skilled in the art, for example, by counting the number of sub-detectors crossed by the charged particle and/or by analyzing the geometric path of the charged particle in the multilayer structure (for example, the deviations of such path) and/or by measuring the quantity of charge deposited by the particle, for example, on each of the sub-detectors involved, and/or by using the data provided by the calorimeter 12 (if provided).

In accordance with an advantageous embodiment, the monitoring method 100 further comprises a step of determining 103 the pitch of the arrival directions of the charged magnetospheric particles with respect to the local magnetic field, and of selecting (for subsequent processing) particles having a pitch included in one or more pitch ranges. Thereby, it is possible to discard detection events which are not, absolutely or statistically, of interest for subsequent processing. For example, charged particles, the arrival direction of which is perpendicular or almost perpendicular to the local magnetic field, may be discarded, since charged particles characterized by these arrival directions are not statistically particles for which a precipitation phenomenon is in progress.

The monitoring method 100 further comprises:
  a step of obtaining 104 ("$N_H$_Obtain") a first count value $N_H$ correlated to the number of charged particles, detected in a period of time, which is associated with a relatively higher estimate or measurement of kinetic energy included in a first energy range;
  a step of obtaining 105 ("$N_L$_Obtain") a second count value $N_L$ correlated to the number of particles, detected in said period of time, which is associated with a relatively lower estimate or measurement of kinetic energy included in a second energy range.
The first energy range and the second energy range may be defined as a high-energy channel and a low-energy channel, respectively.

In accordance with a particularly advantageous embodiment, the first energy range and the second energy range are selected so that under normal conditions the first count value $N_H$ and the second count value $N_L$ are mutually equal or approximately mutually equal.

Conveniently, the first energy range comprises energies greater than 60 MeV and the second energy range comprises energies lower than 40 MeV. Advantageously, the second energy range comprises energies higher than 5 MeV, for example, higher than 10 MeV and lower than 40 MeV.

In accordance with a possible embodiment, the two energy ranges are adjacent to each other and have an extreme in common, equal to, or equal to about, 50 MeV. For example, the first energy range includes energies lower than (or lower/equal to) about 55 MeV and the second energy range includes energies greater/equal to (or greater than) 55 MeV.

For the purposes of the present description, when the word "about" is associated with a numerical value, it is intended to designate both the exact numerical value as well as variations of up to 10% above or below said numerical value.

Again with reference to FIG. 3, the monitoring method 100 further comprises the steps of:
  detecting a relative variation 106 ("Delta_Detect") of the second count value $N_L$ with respect to the first count value $N_H$;
  determining 107 ("MPP_Determ") that in the aforementioned period of time an impulsive event of precipitation of particles in the magnetosphere occurred—or "MPP event"—comparing the aforementioned variation with a threshold value.
From a practical point of view, an MPP event is an event indicative of an impulsive precipitation of charged particles due to resonance phenomena between charged particles and radiation, such as, for example, plasma waves, which propagate in the Earth magnetosphere. Said radiation may, for example, be caused by natural and/or artificial phenomena affecting the Earth atmosphere and/or lithosphere.

According to a particularly advantageous embodiment, the aforementioned threshold value is established correlating historical data of said variations to historical data relating to events of seismic or pre-seismic activity comprising geolocation and intensity information of said events.

The aforementioned MPP event constitutes an event representative of impulsive precipitations of charged magnetospheric particles with respect to precipitations of charged particles which are generally detectable in the absence of perturbations.

The aforementioned time range may be a large or small range at will and, for example, it may be of the order of one second or of the order of ten seconds.

In accordance with an advantageous embodiment, the step of detecting a relative variation 106 comprises an operation of calculating a ratio HR—Hardness Ratio—between the first count value $N_H$ and the second count value $N_L$, or vice versa. The step of determining 107 ("MPP_Determ") that an MPP event has occurred therefore comprises an operation of verifying whether said HR ratio is above, or below, or equal to said threshold value.

For example, in the case where $HR=N_H/N_L$, the threshold value beyond which it may be determined that an MPP event has occurred is greater than or equal to ten, for example, equal to about fifteen, for example equal to fourteen. It has been shown that it is advantageous to select the energy ranges for which the $N_H$ and $N_L$ values are counted, so that such values, under normal conditions, are equal to or almost equal to each other, so that the HR ratio is generally equal to or about equal to one.

In accordance with an advantageous embodiment, the monitoring method 100 further comprises a step of eliminating and/or identifying 108 ("SE_Discard") spurious events, correlating said variation detected in the detecting step 106 with indices of magnetospheric and solar activity. In fact, it is known that some types of events, such as, for example, solar storms, may cause anomalous precipitations of charged magnetospheric particles.

The monitoring method 100 further comprises the steps of:

assigning 109 ("L-T-Assign") to each MPP event a geomagnetic longitude and a time in which the MPP event occurred;

defining 110 ("CL_Def") one or more groups of MPP events, or clusters of MPP events, each group comprising MPP events which occurred in a time range at a same geomagnetic longitude or at relatively close geomagnetic longitudes.

For example, the aforementioned time range is of the order of a few weeks, and, for example, it is equal to 3-5 weeks, for example, it is equal to 4 weeks.

For example, relatively close geomagnetic longitudes are longitudes included in a range of longitudes having an amplitude equal to a maximum of 20° and, for example, equal to, or equal to about, 15° or 10°.

The monitoring method 100, following the step of defining 110 one or more groups of MPP events, comprises a step of identifying 111 ("PPA_Ident") a group or cluster of MPP events as indicative of a natural or artificial terrestrial activity, such as, for example, a pre-seismic or seismic activity, based on the number of MPP events included in the group and/or based on the associated variations found in the detecting step 106. Such number is greater than or equal to one and preferably greater than or equal to two. For example, if a very high HR is associated with the MPP event, it may be decided that the cluster is a degenerate cluster and includes only one MPP event. For MPP events with lower HR, for example, equal to ten, it may be established that a group of MPP events, in order to be indicative of a pre-seismic or seismic activity, must contain a minimum number of events equal to two, or three or four. It should be noted that the aforementioned activities are not limited to seismic or pre-seismic activities, since they may also include other natural activities (for example, of a meteorological nature, such as terrestrial gamma-ray flashes) or artificial activities which may influence the precipitation of particles.

Preferably, the monitoring method 100 further comprises a step 112 ("SA_GEN") of generating a seismic or pre-seismic alert. Said alert may, for example, be displayed on a screen and/or sent by means of a data message, to, for example, a text message or an email.

Figure 4:
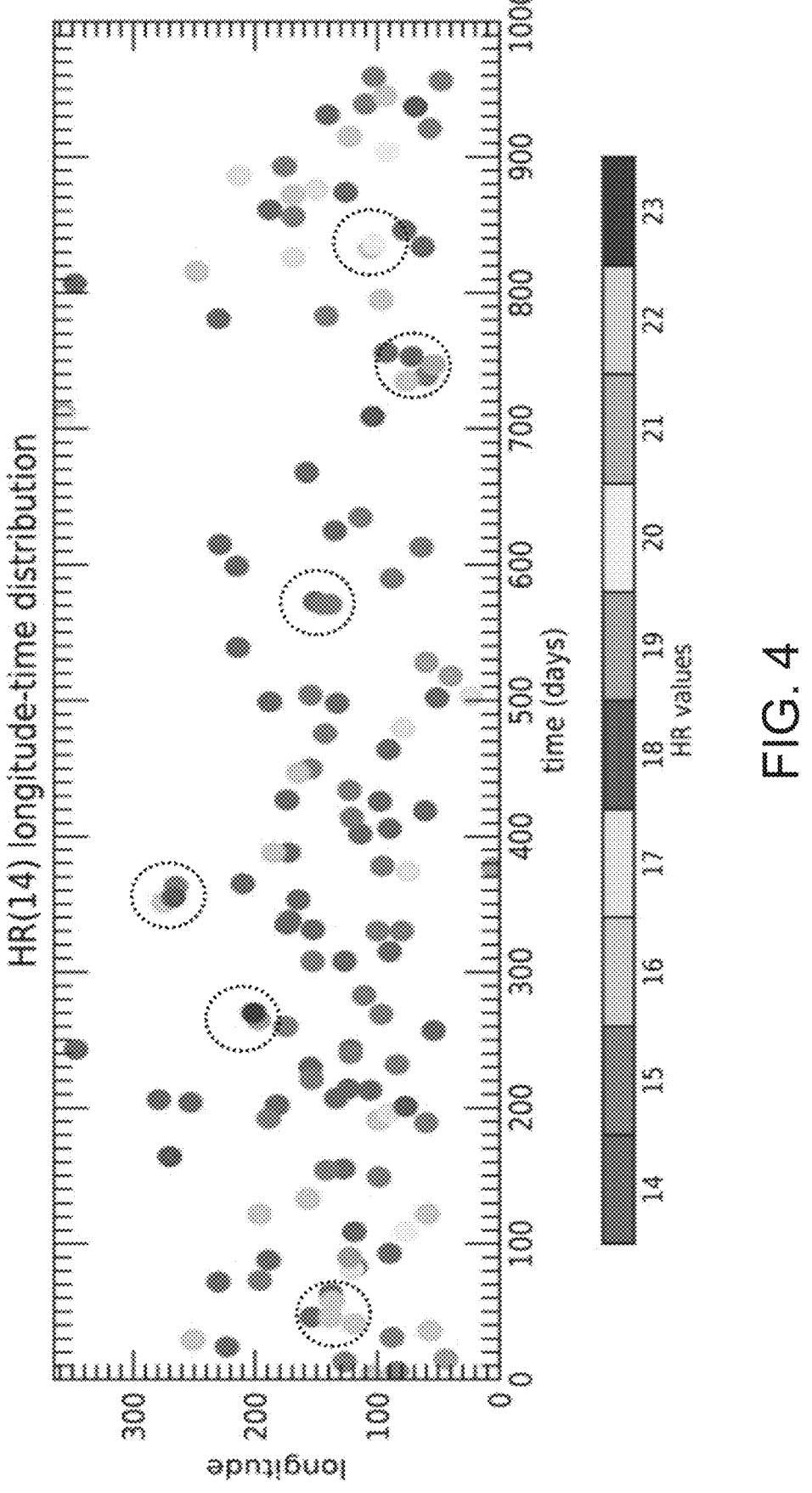
FIG. 4 shows acquired data relating to the precipitation of particles in a two-dimensional time-longitude diagram.

For example, in FIG. 4, MPP events for which the calculated HR (Hardness Ratio) value is greater than or equal to fourteen are mapped on a two-dimensional longitude-time diagram. In these MPP events, in practice, a significant depletion occurred in the precipitation of low-energy charged particles with respect to the precipitation of high-energy charged particles. In FIG. 4, six groups of MPP events, or clusters, identified in the step 111 of the monitoring method 100 have been marked with respective dashed circles.

It should be noted that the steps of the monitoring method 100 described above may be performed in a different order from that of the diagram of FIG. 3, for example, the counting steps 104 and 105 may be inverted or carried out simultaneously. Furthermore, it is necessary to perform the step of detecting particles 101 on board the satellite vehicle 1 while the subsequent processing steps may be performed on the ground after storing the data on board the satellite vehicle 1 and transmitting the data acquired in step 101 to the ground station 2, although the execution of some of said steps on board the satellite vehicle 1 may be advantageous for discarding, already on board the satellite, particles and/or MPP events which are not of interest for the subsequent processing steps, so as to reduce the bandwidth resources required for transmitting data to the ground.

Experimental Results

The experimental results obtained by processing data acquired by the AGILE satellite by means of a processing system based on specially developed software will be described below.

The focus has been on detecting, by the particles detector GRID of the AGILE satellite, with high statistical significance, impulsive decreases of particles detected in the low-energy channel with respect to those detected in the high-energy channel. "Hardness" is defined as the Hardness Ratio (HR) defined as the number of high-energy events divided by the number of low-energy events, both determined during the same time range $\delta t$. An impulsive MPP event is defined in terms of the associated hardness HR during a time range $\delta t$. HR(N) is the value of the hardness relative to the MPP event for HR values greater than or equal to N. The measured rates of the particle counts in the two energy ranges (and therefore the HR(N) values) are subject to the Poisson statistic as well as to possible other effects affecting the existence thereof.

The particle data flow provided by the AGILE satellite along the equatorial orbit continuously provides HR values according to time T and geomagnetic longitude LG. Given the detection capabilities of AGILE, an appropriate binning for the analysis of the longitude and time features of the HR are given by time bins of one day and by geomagnetic longitude bins of one degree. As an example, FIG. 4 shows the longitude and time distribution of the MPP events measured with HR(14) during the acquisition of the data of the present analysis (Apr. 16, 2015-Nov. 30, 2017). It is very important to appreciate that the MPP event measurements in this case were not affected by solar events or by atmospheric flash-induced magnetospheric effects. The local and global lack of homogeneity, which may be seen in the distribution of MPP events in FIG. 4, are therefore not caused by external solar or meteorological effects or by the properties of the particles detector on board the AGILE satellite.

The developed processing system allows to correlate the distributions of the detected MPP events with the occurrence of earthquakes, i.e., seismic events. The data of interest for such earthquake analysis (time of the seismic event, geographical position, magnitude and physical parameters) are obtained from the public archives of the USGS. In order to minimize the influence of random statistical fluctuations, this analysis only considers earthquakes of magnitude M>6 (in MMS scale), with a special emphasis on earthquakes with M>7.

Figure 5A:
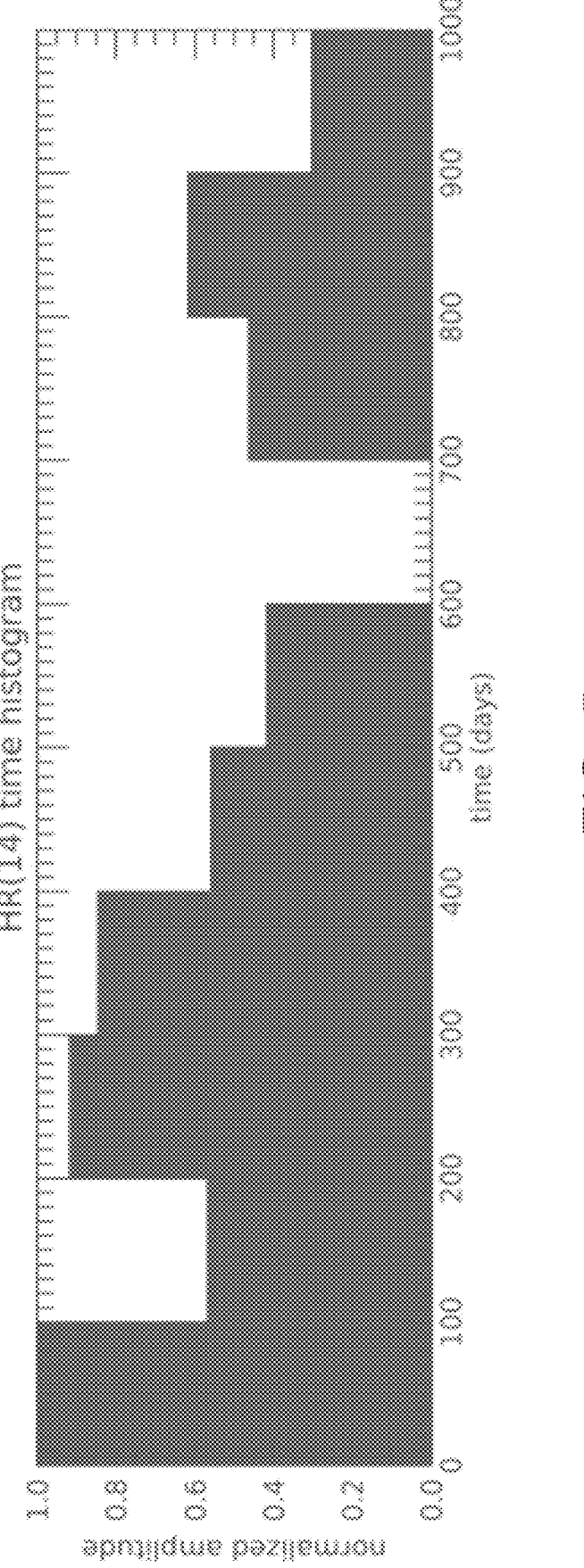
FIG. 5a shows a timing histogram of data acquired with the monitoring method according to the present invention.
Figure 5B:
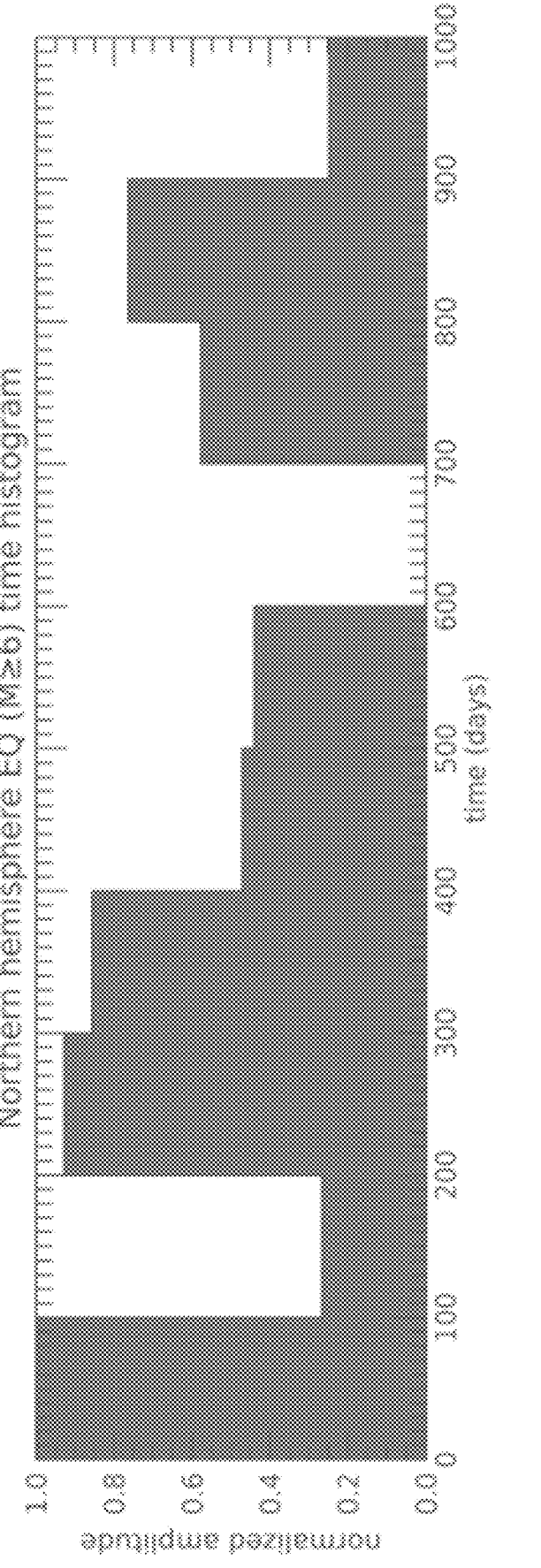

The processing system has allowed to verify the existence of a "global" time correlation between MPP events and earthquakes by considering summed quantities for time bins of one hundred days. Such choice is motivated by the need to initially check the possible correlation between apparently random values of the MPP events and a quantity proportional to the total seismic energy for the most energetic earthquakes. For this purpose, the temporal behavior of two amplitudes was compared. The first amplitude is a quantity proportional to the negative of the logarithm of the joint probability according to the Poisson statistic of having MPP events within the bin of one hundred days. The second amplitude is a quantity proportional to the negative of the logarithm of the joint probability of having earthquakes within the same time bin, assuming the probability of occurrence of earthquakes anticorrelated with the energy thereof. These quantities are summed over the entire range of longitudes (excluding values in the South Atlantic anomaly, SAA) and within time bins of one hundred days and are then plotted as histograms of the normalized values for the MPP events (HR) and for the cumulative energies of the earthquakes ($\psi_N$), separately. FIGS. 5a and 5b show the result of such analysis for the HR(14) and for the earthquakes of magnitude M>6 of the Northern geomagnetic hemisphere. The similarity of the two distributions of MPP events and earthquakes is evident at first glance, with maxima and minima falling within the same time ranges. A joint statistical analysis of the two distributions aimed at testing the hypothesis of a correlation between the two provides the value of the Kolmogorov-Smirnov coefficient equal to 0.97, and a Pearson coefficient equal to 0.928.

As a next step, the geo-localization of the MPP events has been considered, taking into consideration the fact that a value of the geomagnetic longitude LG may be attributed to each MPP event. At this point, the MPP events may be mapped into a two-dimensional longitude-time diagram, and it is possible to identify groups of MPPs (clusters) comprising statistically significant MPPs.

A correlation between prominent MPP events and high-intensity earthquakes may be expected, not only in relation to time but also to geomagnetic longitude, if a fraction of the MPP events are directly correlated with electromagnetic signals originating in earthquake-affected regions and are channeled along the North-South magnetic meridians; such electromagnetic signals propagate along the magnetic field lines (as expected from VLF/ELF and whistler waves). Given the statistics of the MPP events and the coverage of the AGILE satellite per unit of longitude and time, possible correlations between MPP events and earthquakes have been studied on a day-week scale for longitude ranges given by the Dobrovolsky radius $R_D$ (which measures the radius of the region affected by the seismic phenomenon; $R_D$ depends on the magnitude of the seismic event). For each earthquake, a two-dimensional "active region" (AR) is determined, centered on the position of the seismic event defined in geomagnetic longitude by the range $\Delta L'=2R_D$ and in time by the time range $\Delta T'$. This latter quantity is determined by the distributions of time delays $\Delta T=T_{MPP}-T_{EQ}$ (with seven-day bins) between MPPs with HR(15) and earthquakes (EQ) in the Northern geomagnetic hemisphere of magnitudes M≥6.4 and M>7, which occur within regions in the range $\Delta L'$. Both distributions show an excess of peak events in the first negative time bin (implying that a subset of MPP events anticipate seismic events) with a non-symmetric amplitude of the distribution around the peak. From the distributions observed, the time range defining the active regions is obtained from the set of the three bins which precede the seismic event and a bin following it. The total time range defining the active regions is therefore $\Delta T'$=four weeks, consisting of three weeks before the EQ and one week after the EQ. A complete simulation was performed so as to determine the statistical significance of such procedure (see below the section "Statistical Discussion").

After defining the regions of the seismic events, the active regions were then assigned to the MPP clusters in the two-dimensional map, identifying them as regions of possible pre-seismic activity (PPA).

For future events, in the case of significant clustering above the MPP event threshold, the developed processing system produces a pre-seismic warning by specifying the geomagnetic longitude range, the time range and the probability of occurrence of the cluster of MPP events observed.

The processing system also produces MPP event maps obtained for different threshold parameters and may make them available for electronic transmission (computers and smartphones by means of dedicated pages/applications).

Statistical Analysis

MPP events with large Hardness Ratio values (HR) and active regions for large magnitude earthquakes are correlated not only in time but also in geomagnetic longitude. The two-dimensional distributions of MPPs with HR(15) and of the active regions for earthquakes of magnitude M>7 are considered herein. A first estimate of the probability of random occurrence of the similarity of the two distributions is based on the binomial probability $p=2\times10^{-8}$ that the observed MPP events overlap in time and longitude the active regions. Such value is confirmed by a complete simulation, as shown below.

The statistical significance of the results obtained was determined by carrying out a complete simulation of the HR signals, reproducing the random fluctuations induced by the Poisson statistic influencing the MPP events. Three conditions were imposed to select cases of interest for randomly generated distributions. The first condition (C1) is based on the global temporal correlation shown in FIGS. 5a and 5b: a simulated distribution of MPP events must satisfy the requirement of reproducing a correlation similar to that shown in FIGS. 5a and 5b. The second condition (C2) is imposed by the two-dimensional distributions: the total number of HR(15) falling within the active regions for seismic events with M>7 must be equal to or greater than 17 (as determined by the observations). The third condition (C3) is dictated by imposing that the number of active regions with at least one HR(15) therein is greater than or equal to 10 out of the 13 in total, obtained from the observations. A first estimate of the pre-trial probability may be obtained from the product of the three conditional probabilities of C1-C2-C3, $P_{tot-pre}=P(C1,C2,C3)=P(C1)P(C2|C1) P(C3|C1,C2)$.

The estimate $P(C1)=7.3\times10^{-5}$, based on the value of the Pearson coefficient of FIGS. 5a and 5b, had already been obtained. A binomial estimate of the (unconditional) probability $P(C2)=2\times10^{-8}$ was also obtained. Furthermore, it holds $P(C3|C1,C2)=0.22$. The product of these probabilities is therefore $P(C1) P(C2) P(C3|C1,C2)=3.2\times10^{-13}$.

However, due to the difficulty in determining the conditional probability $P(C2|C1)$, only a complete simulation with a sufficiently large number of iterations may provide the final value of the total pre-trial probability $P_{tot-pre}$. A complete simulation was then carried out with a total number of iterations equal to $6.267\times10^{12}$. Such simulation produces 25 cases of simulated configurations which satisfy the conditions C1-C2-C3 for the case of HR(15) and of EQ in the Northern geomagnetic hemisphere with M>7. As a result of this simulation, the pre-trial probability for this case is therefore $P_{tot-pre}=3.99\times10^{-12}$.

The final probability is obtained by considering the number of trials performed. The conservative estimate of the number of trials is $N_{trial}=2.6\times10^4$. The final post-trial total probability that the detected distributions occur randomly is therefore given by the product of $P_{tot\text{-}pre}$ with $N_{trial}$, which yields $P_{tot\text{-}post}$ [HR(15), M>7]=$1.04\times10^{-7}$. This value corresponds to a statistical significance greater than 5 sigma in units of equivalent standard deviations of a bilateral Gaussian distribution.

An independent simulation for the case of HR(15) and earthquakes with M≥6.4 ($6.058\times10^{12}$ iterations) produces 84 cases which satisfy the conditions C1-C2-C3, and a value $P_{tot\text{-}pre}$=$1.39\times10^{-11}$, which implies $P_{tot\text{-}post}$ [HR(15), M≥6.4] =$3.6\times10^{-7}$; such value is slightly below the significance of 5 sigma in units of equivalent standard deviations of a bilateral Gaussian distribution.

CONCLUSIONS

From the above, it is apparent that the monitoring method 100 and the monitoring system 1, 2 described above allow to fully achieve the preset objects in terms of overcoming the drawbacks of the prior art. By virtue of the analysis of the variations of the precipitation of charged particles, respectively in a relatively high-energy channel and a relatively low-energy channel, if such variations are considered as significant, it is possible to obtain a high degree of correlation between groups of MPP events and seismic events of relatively high magnitude (M>6) and therefore generate seismic or pre-seismic alerts.

Having established with unprecedented statistical significance the existence of a correlation between MPP events and energetic earthquakes in the Northern geomagnetic hemisphere, it is possible to attribute the causes of the phenomenon of impulsive precipitation of charged particles, observed by means of the monitoring method described, to the wave-particle resonance in the range of the electromagnetic waves of the ELF type. This interpretation is in accordance with what is expected from the propagation of electromagnetic waves in the lithosphere which must pass through rocks and saline water.

Without prejudice to the principle of the invention, the embodiments and the constructional details may be broadly varied with respect to the above description disclosed by way of non-limiting example, without departing from the scope of the invention as defined in the appended claims.

The invention claimed is:

1. A method for monitoring precipitation of magnetospheric particles, the method comprising the steps of:
   detecting charged magnetospheric particles by at least one particles detector installed on board at least one satellite vehicle in orbit by associating the detected charged magnetospheric particles with respective detection data;
   processing the detection data to associate a respective estimate or measurement of kinetic energy with the detected charged magnetospheric particles;
   obtaining a first count value $N_H$ correlated to a number of charged magnetospheric particles, detected in a period of time, which is associated with a relatively higher estimate or measurement of kinetic energy included in a first energy range;
   obtaining a second count value $N_L$ correlated to the number of charged magnetospheric particles, detected in said period of time, which is associated with a relatively lower estimate or measurement of kinetic energy included in a second energy range;
   detecting a relative variation of the second count value $N_L$ with respect to the first count value $N_H$;
   determining that in said period of time an impulsive event of precipitation of charged magnetospheric particles (MPP event) in the magnetosphere occurred by comparing said variation with a threshold value;
   assigning to the MPP event a geomagnetic longitude and a time in which the MPP event occurred;
   defining one or more groups of MPP events, each group comprising MPP events occurred in a time range at a same geomagnetic longitude or at relatively close geomagnetic longitudes; and
   identifying a group of MPP events as indicative of an activity of terrestrial origin, based on the number of MPP events included in the group and/or based on the relative variation detected in the detecting step;
   reducing bandwidth required for transmission to a ground station by discarding, on board the at least one satellite, at least part of the detection data not associated with the identified group; and
   transmitting, by said ground station or said at least one satellite, a seismic alert that specifies one or more of: a geomagnetic longitude range, a time range, and a probability of occurrence of the identified group determined from historical correlations.

2. The method of claim 1, further comprising a step of generating the seismic alert of a pre-seismic or seismic activity.

3. The method of claim 1, wherein said step of detecting a relative variation includes an operation of calculating a hardness ratio of the first count value $N_H$ to the second count value $N_L$, or vice versa, and the determining step includes an operation of verifying whether said hardness ratio is higher, lower, or equal to said threshold value.

4. The method of claim 1, wherein said at least one satellite vehicle is in equatorial orbit.

5. The method of claim 1, comprising a step of eliminating and/or identifying spurious events correlating said detected variation with indices of magnetospheric and solar activity.

6. The method of claim 1, wherein the at least one particles detector allows detecting charged magnetospheric particles distinguishing them from gamma rays.

7. The method of claim 1, wherein the at least one particles detector comprises a particles imaging tracker and/or an imaging calorimeter.

8. The method of claim 1, wherein the first energy range and the second energy range are selected so that under normal conditions the first count value $N_H$ and the second count value $N_L$ are mutually equal or approximately mutually equal.

9. The method of claim 1, wherein said charged magnetospheric particles are mostly electrons and positrons.

10. The method of claim 1, wherein said at least one particles detector is configured to detect and trace charged magnetospheric particles having energy less than 1 GeV.

11. The method of claim 1, comprising a step of storing said detection data on board the at least one satellite vehicle and a step of directly or indirectly transmitting at least part of said detection data to a ground station operatively connectable to said at least one satellite vehicle.

12. The method of claim 11, comprising a step of at least partially processing said detection data on board the at least one satellite vehicle, wherein the transmitting step comprises transmitting said at least partially processed detection data.

13. The method of claim 1, wherein the threshold value is established correlating historical data of said variation to historical data related to seismic events comprising geolocation and intensity information of said seismic events.

14. The method of claim 1, further comprising a step of determining a pitch of the charged magnetospheric particles with respect to a local magnetic field and selecting charged magnetospheric particles having a pitch included in one or more pitch ranges.

15. The method of claim 1, wherein the activity of terrestrial origin is a pre-seismic or seismic activity.

16. The method of claim 1, wherein said at least one satellite vehicle is in an equatorial low Earth orbit (LEO).

* * * * *